(12) United States Patent
Mollhagen

(10) Patent No.: US 11,242,696 B2
(45) Date of Patent: Feb. 8, 2022

(54) TRANSPORTABLE CORRAL

(71) Applicant: Jon Davis Mollhagen, Lorraine, KS (US)

(72) Inventor: Jon Davis Mollhagen, Lorraine, KS (US)

( * ) Notice: Subject to any disclaimer, the term of this patent is extended or adjusted under 35 U.S.C. 154(b) by 212 days.

(21) Appl. No.: 16/530,810

(22) Filed: Aug. 2, 2019

(65) Prior Publication Data

US 2020/0040600 A1 Feb. 6, 2020

Related U.S. Application Data

(60) Provisional application No. 62/715,124, filed on Aug. 6, 2018.

(51) Int. Cl.
*E04H 17/18* (2006.01)
*A01K 3/00* (2006.01)

(52) U.S. Cl.
CPC .......... *E04H 17/18* (2013.01); *A01K 3/00* (2013.01)

(58) Field of Classification Search
CPC ........ A01K 3/00; A01K 1/0035; E04H 17/16; E04H 17/18
See application file for complete search history.

(56) References Cited

U.S. PATENT DOCUMENTS

| | | | |
|---|---|---|---|
| 1,882,150 A * | 10/1932 | Kent | E01F 13/02 52/70 |
| 3,368,504 A | 2/1968 | Cohen | |
| 3,921,585 A * | 11/1975 | Hall | B60P 3/04 119/512 |
| 4,537,151 A * | 8/1985 | Bolton | A01K 3/00 119/512 |
| 5,899,171 A * | 5/1999 | Abrahamson | E04H 17/22 119/512 |
| 7,325,513 B1 | 2/2008 | Velaquez | |
| 7,958,616 B2 * | 6/2011 | Meyer, Jr. | A01K 3/00 29/468 |
| 9,622,453 B2 * | 4/2017 | Wilson | A01K 3/00 |
| 2015/0196006 A1 * | 7/2015 | Scudder | A63K 1/00 119/702 |
| 2016/0047141 A1 * | 2/2016 | Juett | E06B 11/022 256/25 |
| 2017/0009485 A1 | 1/2017 | Gentry et al. | |
| 2018/0020634 A1 | 1/2018 | Mazzilli | |

OTHER PUBLICATIONS

ISA Patent Search Report for PCT/US2019/044782 dated Oct. 25, 2019.

* cited by examiner

*Primary Examiner* — Michael P Ferguson
(74) *Attorney, Agent, or Firm* — Robet Blinn

(57) ABSTRACT

A transportable corral includes a plurality of fence panels that are hinged to each other in an end to end manner, manually releasable fence panel latches that are mounted to the fence panels and are arranged to engage and latch together adjacent fence panels so that the plurality of fence panels are able to be folded into a compact fence panel set to facilitate transport. Retractable wheel assemblies that are mounted to the fence panels to facilitate movement of a fence panel set or to facilitate the movement of an individual fence panel.

4 Claims, 7 Drawing Sheets

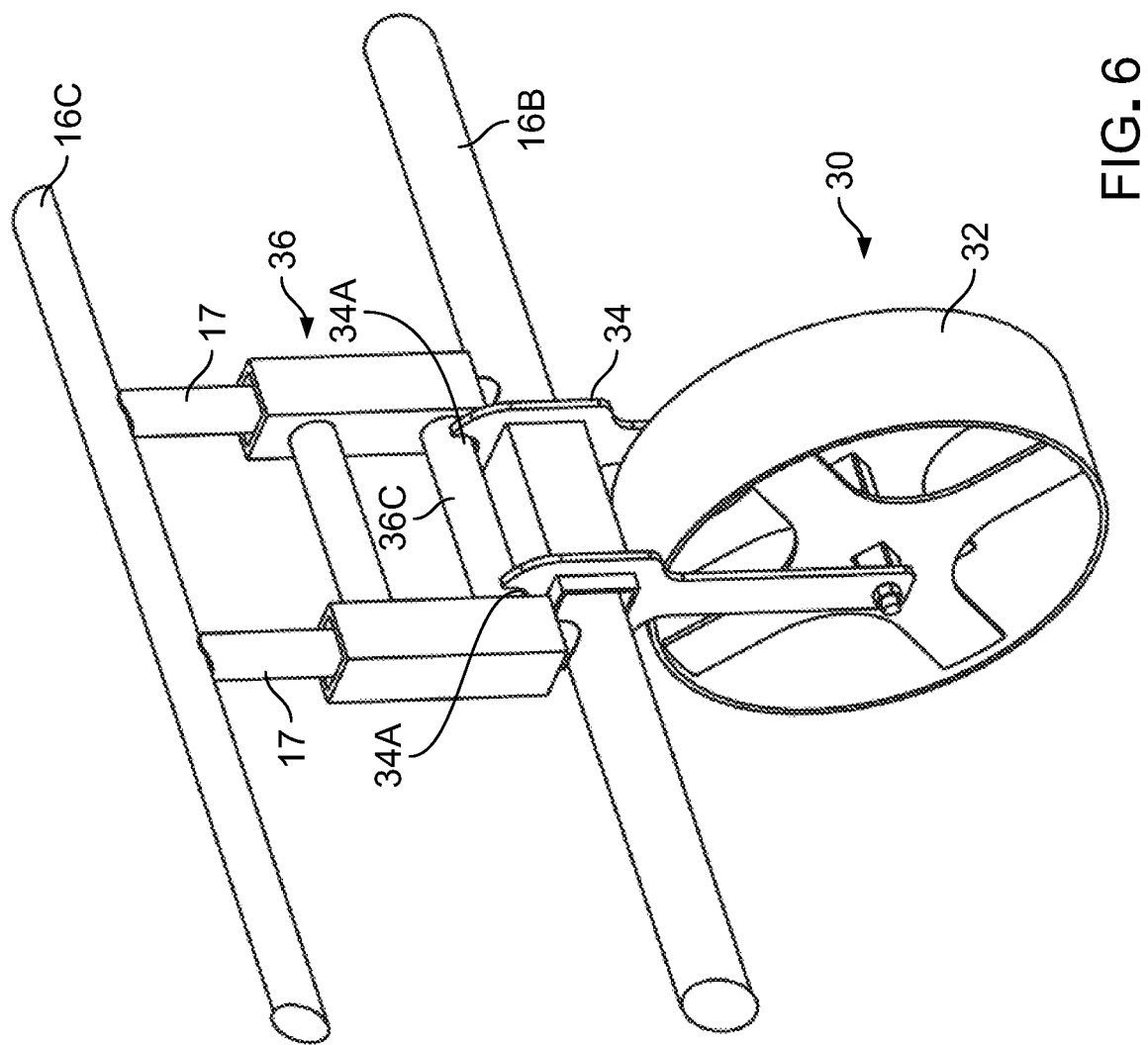

TRANSPORTABLE CORRAL

CROSS REFERENCES TO RELATED APPLICATIONS

This application claims the benefit of U.S. Provisional Utility Patent Application No. 62/715,124 filed on Aug. 6, 2018 which is incorporated herein by reference as if repeated verbatim hereinafter.

FIELD

The present invention relates to a transportable corral structure that is able to be folded into a compact form and mated to a trailer structure for transport.

BACKGROUND

Those who transport livestock animals often have a need to enclose them in an open area after arriving at a destination. What is needed is a corral structure that is able to be folded into a relatively compact configuration that is then able to loaded onto a trailer for transport.

SUMMARY

The above noted need is addressed by a transportable corral that is comprised of a plurality of fence panels that are hinged to each other in an end to end manner. Manually releasable panel latches are mounted to the fence panels that are arranged to automatically engage and latch with an adjacent fence panel so that the plurality of fence panels are able to be folded into a compact arrangement for transport. Retractable wheel assemblies are mounted to the fence panels to facilitate movement and relocation of the folded arrangement or of individual fence panels. The panel latches are able to be released sequentially to permit each fence panel to be unfolded from the compact arrangement into an extended position. Once the fence panels have been deployed, it is possible to arrange the fence panels into an enclosed corral configuration. Once the fence panels have been arranged into an enclosing corral configuration, the wheel of each panel is retracted so that each fence panel rests directly on the ground. Each fence panel is also provided with a retractable strut that is able to be pivoted into an extended position toward the exterior of the corral. Each strut braces each fence panel from forces that may be applied from the interior of the corral by livestock animals enclosed within the corral.

BRIEF DESCRIPTION OF THE DRAWINGS

FIG. 6 is a close-up perspective view of a fence panel wheel assembly showing the fence panel wheel in an extended fence panel supporting position.

DETAILED DESCRIPTION

Figure 1:
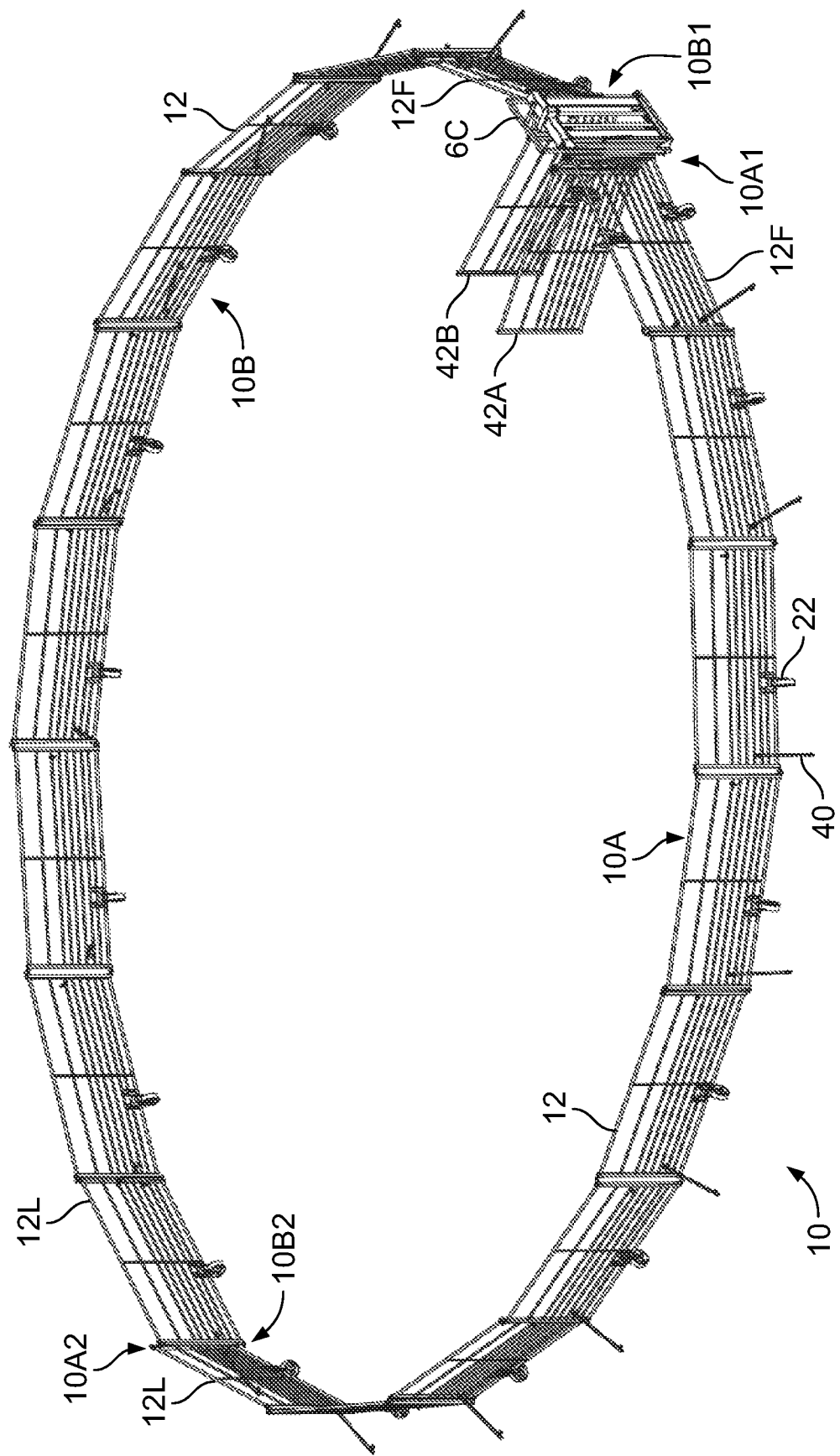
FIG. 1 is a perspective view of one embodiment of the transportable corral showing the fence panels unfolded and arranged in a manner suitable for enclosing livestock animals.

Referring to the drawings, FIG. 1 shows one embodiment of a transportable corral 10. As shown in FIG. 1, transportable corral 10 includes a series of panels 12, including a first fence panel 12F and a last fence panel 12L, that are hinged together in a sequential manner and are organized into two sets of fence panels indicated in FIG. 1 as a first set of fence panels 10A and a second set of fence panels 10B. Both first and second sets of fence panels 10A and 10B have a first proximal end (10A1 and 10B1 respectively) and a second distal end (10A2 and 10B2 respectively). First and second sets of fence panels 10A and 10B are joined together by a gate structure 40 at their proximal ends. Distal ends 10A2 and 10B2 are able to be joined together to complete a fully enclosed corral. However, in FIG. 1, distal ends 10A2 and 10B2 but are shown in the non-joined condition. Optional additional fence panels 42A and 42B may be hinged to gate structure 40 to provide an additional chute structure for directing livestock animals into the corral.

Figure 4:
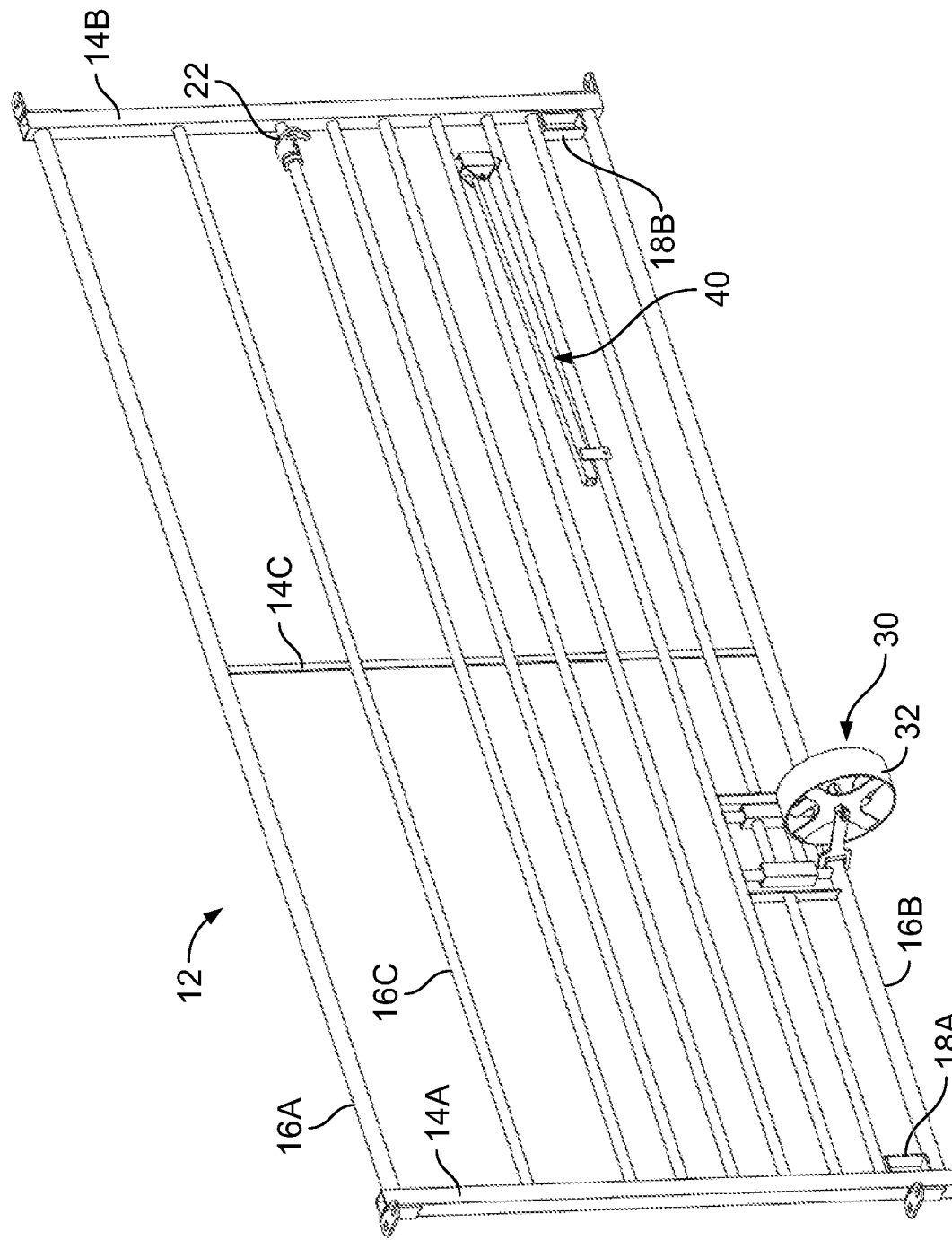
FIG. 4 is a perspective view of a fence panel with the fence panel brace in a retracted position and with the fence panel wheel assembly in a retracted position.

As can be seen in FIG. 4, in this example, each fence panel 12 includes two opposite upright end members 14A and 14B, a center upright member 14C and a plurality of cross members that include a top cross member 16A, a bottom cross member 16B and a plurality of center cross members 16C. Preferably, all of these members are fixed to each other preferably by weldments. Center cross members 16C are preferably spaced sufficiently close together to allow transportable corral 10 to be used for a wide range of livestock animals of varying sizes even including small sheep and the like. This is especially the case, in this example for center cross members 16C that are arranged near the lower end of fence panel 12. As can be best seen in FIG. 4, two slots 18A and 18B are defined, in this example, by short, rectangular steel tube sections that are welded in place at opposite ends of fence panel 12 between bottom cross member 16B and the first adjacent center cross member 16C and preferably immediately adjacent to upright end members 14A and 14B respectively.

Figure 2:
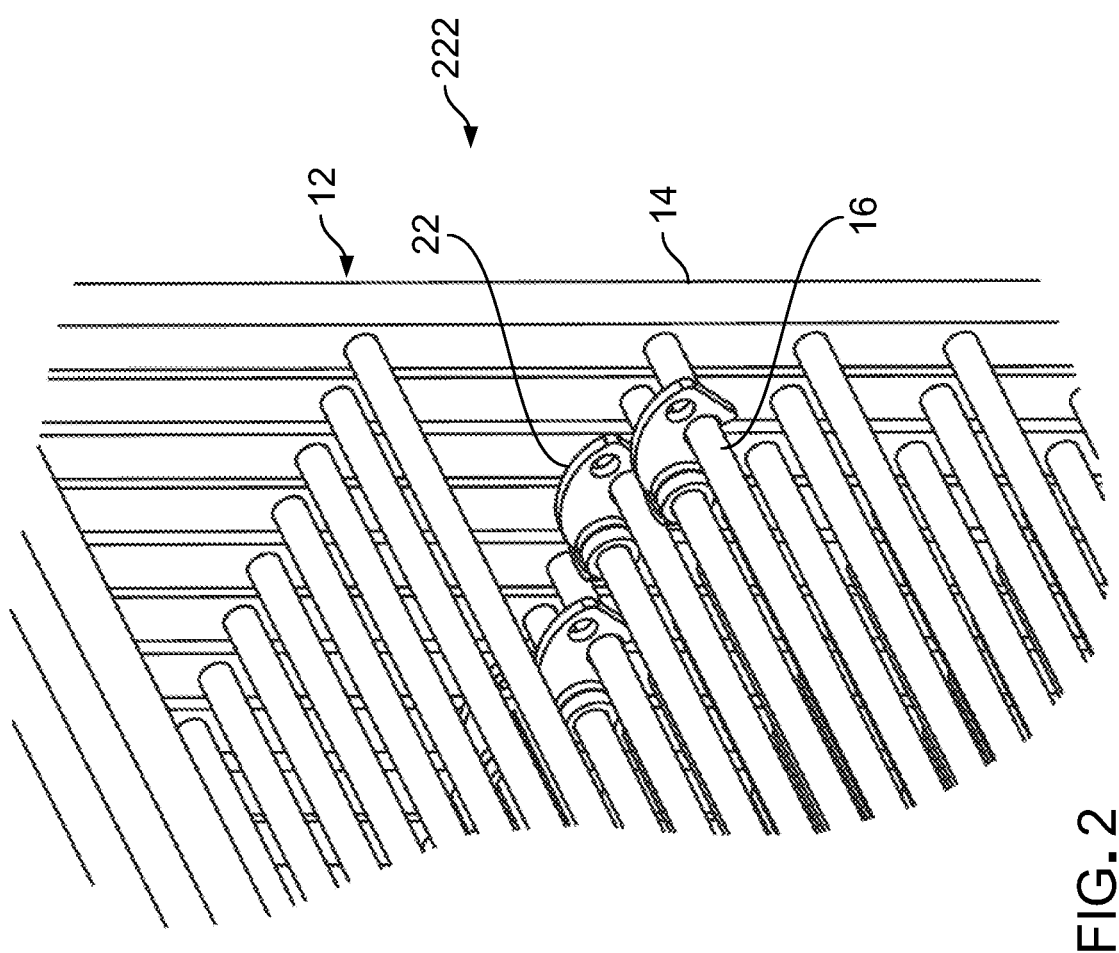
FIG. 2 a partial perspective view of a set of fence panels arranged in a folded condition.
Figure 3:
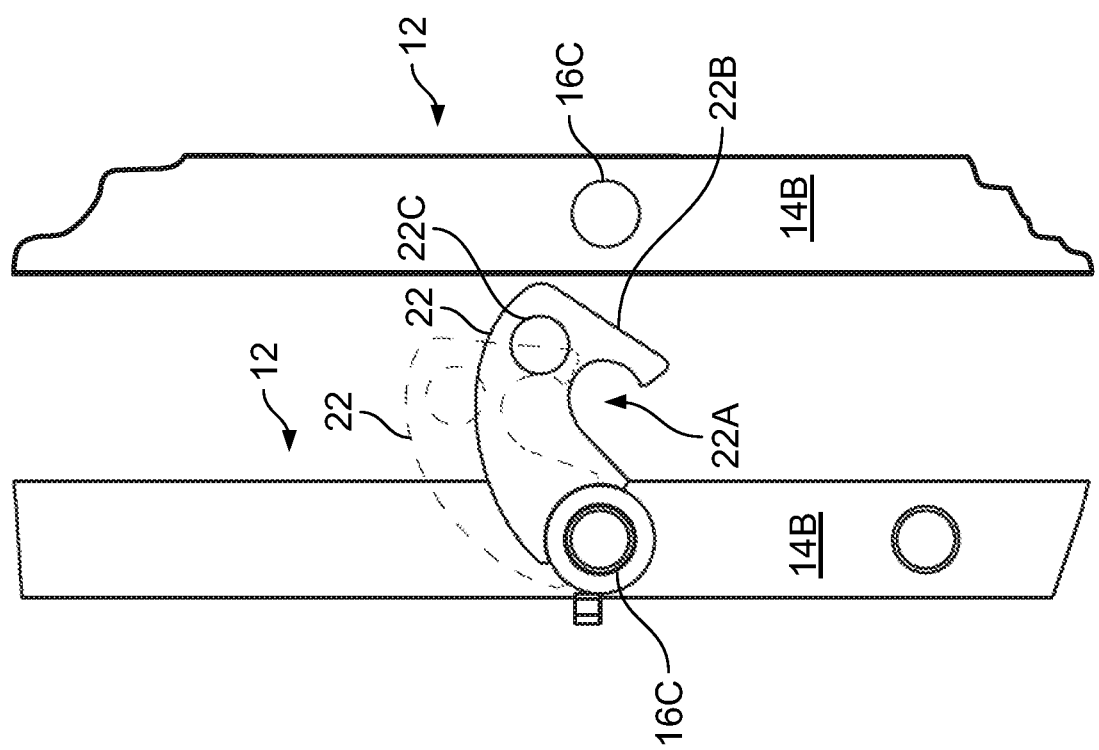
FIG. 3 is a close-up view of a latch assembly showing the latch assembly in an unlatched position.

As can be seen in FIGS. 2 and 3, each fence panel 12 (with perhaps the exception of one of the end fence panels in a set of fence panels) includes a latch 22. A number of latches 22 are shown securing fence panels in a set of fence panels in FIG. 2. One latch 22 is shown in greater detail in FIG. 3. As can be seen in FIG. 3, latch 22 is able to move between a first position shown in FIG. 3 with solid lines and a second raised position shown in FIG. 3 with dashed lines. It is preferable that latch 22 be arranged so that it is not able to rotate significantly outside the first and second positions shown in FIG. 3. Because latches 22 are biased in the first position shown with solid lines in FIG. 3, a set of fence panels 12 may be pushed together to cause a forward, leading sloped surface 22B of each latch 22 to contact an adjacent center cross member 16C of an adjacent fence panel 12 and subsequently ride up on the center cross member 16C and then, because of the gravity biasing of latch 22, rotate toward the first position so that a recess 22A located behind sloped surface 22B of latch 22 captures the adjacent cross member 16C as shown in FIG. 2. The result of repeatedly pushing adjacent fence panels 12 together as latches 22 engage adjacent cross members 16C as described above is a set of fence panels 12 that are held together in a fence panel set 222 (indicated in FIGS. 7 and 9). As noted above, a fence panel set 222 is suitable for subsequent mounting on a trailer for transport. The fence panels are able to be unfolded from each other if an operator manually lifts a latch 22 and pivots the previously latched fence panel 12 away from the adjacent fence panel 12 to which it was latched and does so repeatedly until all fence panels 12 in a fence panel set 222 are free to be arranged as shown in FIG. 1.

As can be seen in FIG. 4, each fence panel 12 includes a wheel assembly 30. As can be seen in FIGS. 4 and 6, each wheel assembly 30 further includes a retractable wheel 32. Each wheel assembly 30 is arranged so that it is possible to place wheel 32 in a retracted position as shown in FIG. 4 or in an extended fence panel supporting position as shown in FIG. 6. As can be seen in FIG. 6, wheel 32 is mounted on a yoke 34 which is able to rotate on the bottom horizontal fence member 16 of fence panel 12. Yoke 34 has two notches 34A that are located at the upper end of yoke 34 and that are arranged to receive a cross member 36C of a slidably mounted shuttle 36. Shuttle 36 is slidably mounted on two vertical members 17 that connect between bottom horizontal member 16B and the center horizontal member 16C that is directly above bottom horizontal member 16B. Shuttle 36 is biased by gravity to engage notches 34A and thereby retain wheel assembly 30 in the extended fence panel supporting position shown in FIG. 6. By manually lifting shuttle 36 an operator is able disengage shuttle 36 from notches 34A and thereby rotate wheel assembly 30 from the extended fence panel supporting position shown in FIG. 6 to the retracted position shown in FIG. 4.

When fence panels 12 are arranged for use as a corral, it is preferable that fence panels 12 are not supported by wheels 32 and it is further preferable that fence panels 12 are secured from moving or tipping over. An operator is able to deploy a wheel assembly 30 to the extended position by lifting a fence panel 12 away from the ground. When fence panel 12 is lifted, wheel assembly 30, being gravity biased toward the extended position shown in FIG. 6 will rotate to the extended position shown in FIG. 6. Shuttle 36, which is also gravity biased as noted above, will drop into engagement with notches 34A thereby securing wheel assembly 20 in the extended transport position shown in FIG. 6 and FIGS. 7-10.

Figure 5:
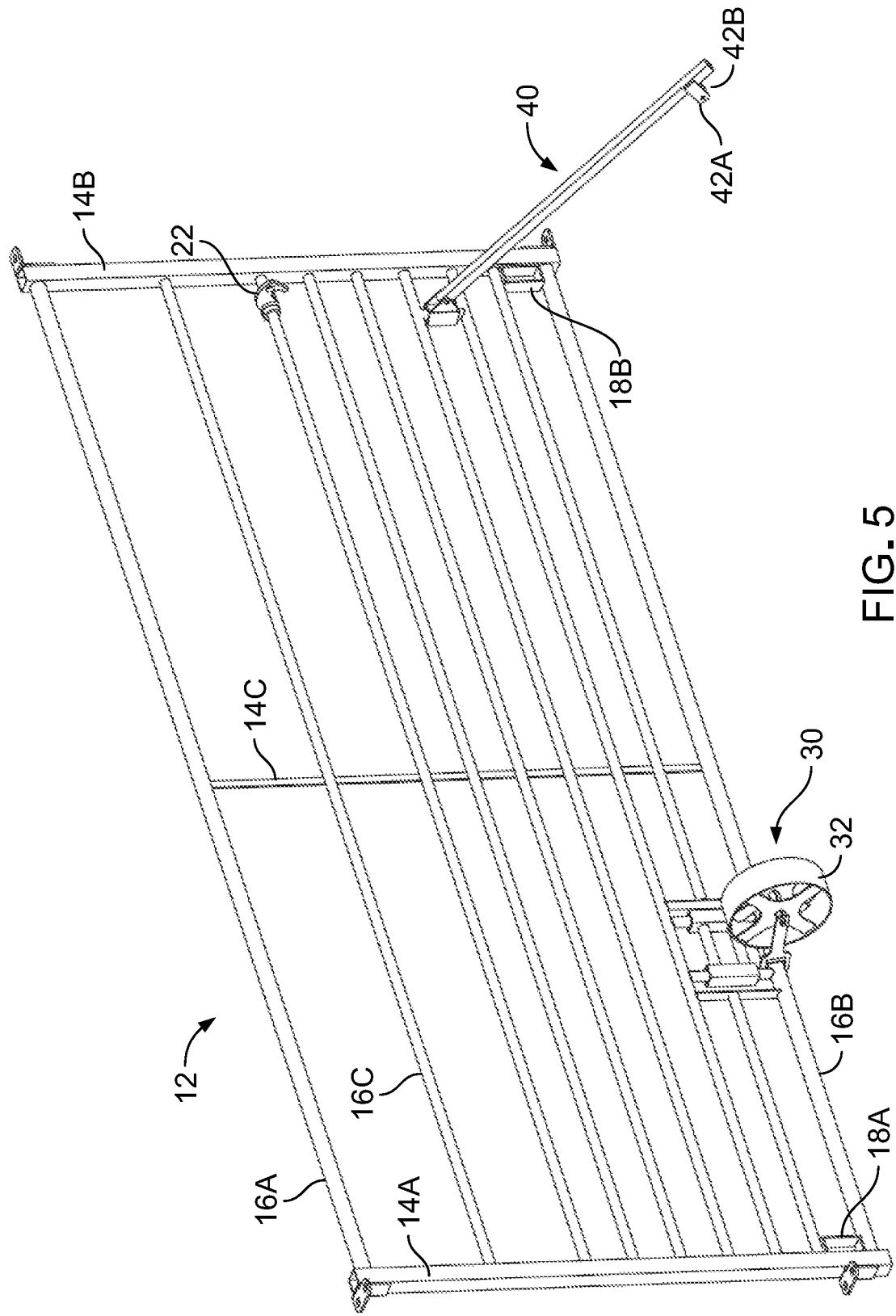
FIG. 5 is a perspective view of a fence panel with the fence panel brace in an extended position and with the fence panel wheel assembly in a retracted position.

When fence panels 12 are arranged in a corral as shown in FIG. 1, and when wheel assemblies 30 are in the retracted position as shown in FIG. 5, it is also preferable that a brace assembly 40 of each fence panel 12 is deployed in the extended position shown in FIG. 5. As can be seen in FIGS. 4 and 5, brace assembly 40 is pivotably mounted to an upright member that extends between two fence panel center cross members 16C. Brace assembly 40 is able to move between a retracted position as shown in FIG. 4 and the extended position shown in FIG. 5. In this example, when brace assembly 40 is in the retracted position, two opposite downwardly extending flanges (42A and 42B) define an upside down U shaped arrangement which is able to engage a cross member 16 in order to secure brace assembly 40 in the retracted position. When brace assembly 40 is extended as shown in FIG. 5, those same downwardly extending flanges 42A and 42B function as cleats for engaging the soil and increasing the effectiveness of brace member 40. When each brace member 40 of each fence panel 12 is deployed to the extended position, it becomes very difficult for livestock animals inside corral 10 to cause fence panels 12 to tip over in an outward direction.

Figure 7:
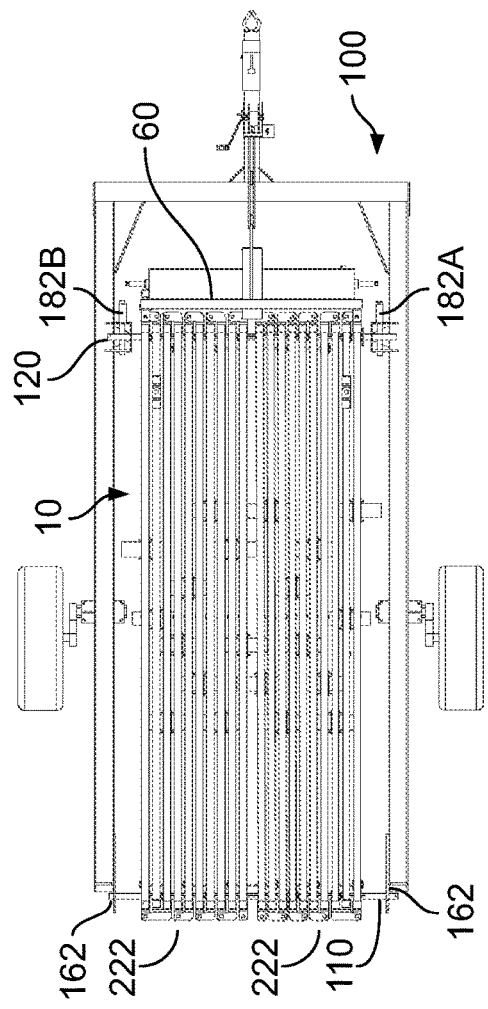
FIG. 7 is a top view of the transportable corral in a folded condition and supported by a trailer.
Figure 8:
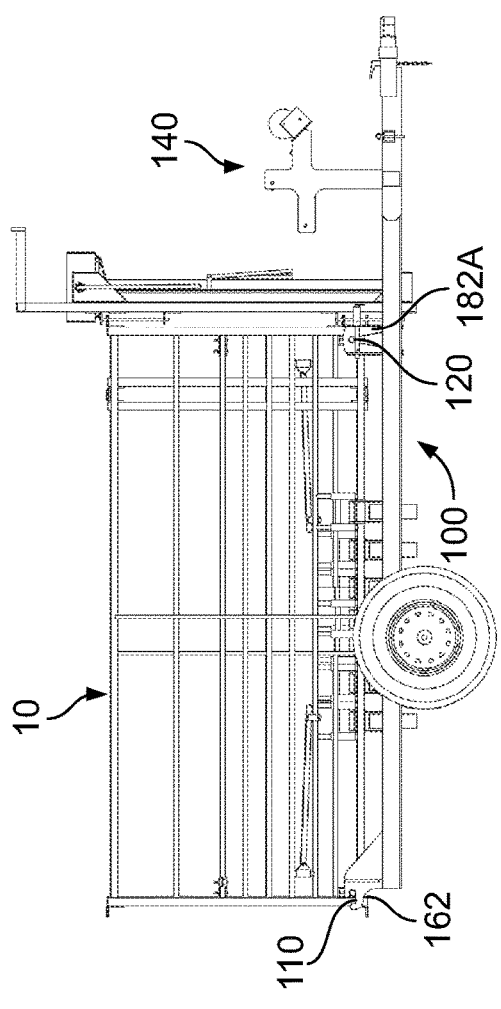
FIG. 8 is a side view of the transportable corral in a folded condition and supported by a trailer.

As can be best understood by referring to FIGS. 2 and 7, in this example, sets of fence panels 12 are able to be folded and latched together to make two folded panel sets 222. With reference to FIG. 8, it is possible to see that wheel assemblies 30 are arranged in staggered positions on fence panels 12 so that wheel assemblies 30 do not interfere with each other when fence panels 12 are folded into fence panel sets 222. Moreover, it is also the case that while brace assemblies 40 are all retracted and secured, wheel assemblies 30 must be extended and supporting fence panels 12 if fence panels 12 are to be maneuvered into the folded condition and if folded fence panel sets 222 are to be rolled into close proximity as shown in FIG. 7.

Figure 9:
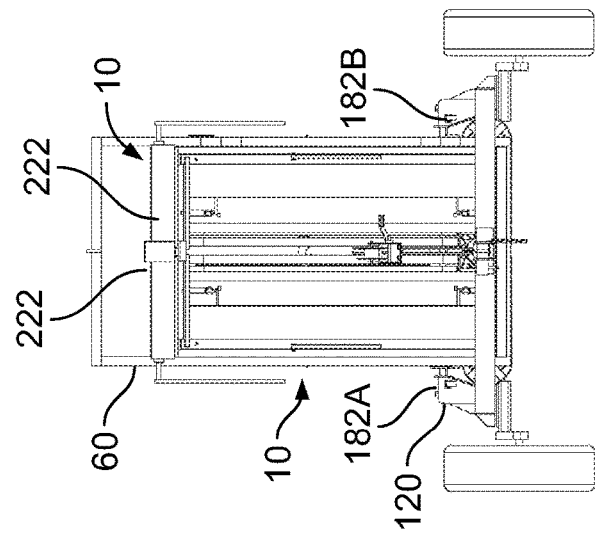
FIG. 9 is a front view of the transportable corral in a folded condition and supported by a trailer.

As can be best understood by referring to FIGS. 7-9, once folded and latched together, the folded fence panels sets 222 are arranged in a compact configuration. When fence panel sets 222 are folded and latched together, it is possible to load corral 10 on a trailer 100 for transport. Gate structure 60 provides an end frame that holds together folded fence panel sets 222. As can be seen by referring to FIG. 4 and FIGS. 7-9, a pair of lift bars, namely a rear lift bare 110 and a forward lift bar 120 are inserted through the aligned slots 18A and 18B (shown in FIG. 4) of fence panels 12. When fence panels 12 are folded together into a folded fence panel set 222, slots 18A and 18B shown in FIG. 4 actually align in an alternating fashion, such as 18A, 18B, 18A . . . , because fence panels 12 are pivotably connected to each other in an end to end manner. In a manner that is well understood in the art, trailer 100 is maneuvered into position and tilted with the rear end down in order to engage lift bar 110. Because lift bar 110 extends well beyond the outboard limits of folded fence panel sets 222 and to a width that corresponds to the width of the trailer frame, lift bar 110 is able to be captured by receiving structures 162 at the back end of trailer 100. Once firmly secured, lift bar 110 actually becomes part of the frame of trailer 100. Lift bar 120 is shorter than lift bar 110. Thus, by using a winch 140, it is possible to raise forward lift bar 120 between the side members of the trailer frame into engagement with receiving structures 182A and 182B on the right and left side respectively of the frame of trailer 100 toward the forward end of trailer 100. Once rear lift bar 110 and forward lift bar 120 are secured, corral 10 may be transported using trailer 100.

A reverse method for deploying transportable corral 10 would entail unloading folded fence panel sets 222 from trailer 100 by lowering and disengaging rear lift bar 110 and forward lift bar 120 from trailer 100, pulling trailer 100 away from fence panel sets 222, removing rear and forward lift bars 110 and 120 from slots 18A and 18B, rotating fence panels sets 222 away from each other, lifting and disengaging latches 22 as each fence panel 12 is disconnected from an adjacent fence panel 12 and pivoted away from its adjacent fence panel 12 so that fence panels 12 are able to be arranged generally as shown in FIG. 1.

The preferable material for the various structures described above would include various grades of high strength steel, in the form of stock square and round tubes, plate and the like. However, other suitable materials may be selected.

Accordingly, from the above description, the skilled reader may appreciate that transportable corral 10 is able to enclose a large area for livestock animals and yet is able to be folded into a compact configuration which is able to be secured on a trailer for transport.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A transportable corral, comprising:
a plurality of fence panels that are hinged to each other in an end to end manner thereby defining a fence panel set that extends between a first fence panel and a last fence panel,
the fence panels comprising wheel assemblies that are able to be moved between a retracted position and an extended position for supporting the fence panel for facilitating movement and positioning of the fence panel,
the fence panels each include first and second upright end members and at least top and bottom cross members, and each wheel assembly of each fence panel including a yoke that is rotatably mounted to the bottom cross member of each fence panel, the yoke being arranged for rotatably supporting the wheel of the wheel assembly, and wherein a latch mechanism is arranged between the fence panel and the yoke for securing the yoke for placing the wheel assembly in the extended operating fence panel supporting position, the latch mechanism also being releasable so that the wheel assembly may be rotated into a retracted position such that the wheel assembly does not support the fence panel, and
the fence panels further including fence panel latches for latching together adjacent fence panels so that the fence panels of a set of fence panels may be folded together and secured to complete a folded secured fence panel set suitable for transport.

2. The transportable corral of claim 1, wherein:
the fence panels each include first and second upright end members and at least top and bottom cross members and each fence panel comprises a first slot adjacent to the first upright end member and the bottom cross member and a second slot adjacent to the second upright end member and the bottom cross member, the slots being arranged such that when the fence panels are folded into a set, the slots align to provide a first channel at the rear of the set for receiving a rear lift bar that is suitable for being received and supported at the rear end of a trailer and a second channel at the forward end of the set for receiving a forward lift bar that is suitable for being received and supported at the forward end of a trailer.

3. A transportable corral, comprising:
a plurality of fence panels that are hinged to each other in an end to end manner thereby defining a fence panel set that extends between a first fence panel and a last fence panel,
the fence panels comprising wheel assemblies that are able to be moved between a retracted position and an extended position for supporting the fence panel for facilitating movement and positioning of the fence panel,
the fence panels each including opposing upright end members with cross members extending therebetween and fence panel latches,
the fence panel latches each including a latch member that is rotatably mounted on a cross member of a first fence panel and biased in a first position such that the latch member comprises a sloped surface that is arranged to contact a corresponding cross member of a second adjacent fence panel that is hinged to the first fence panel thereby causing rotation of the latch member from the first position to a second raised position as the first fence panel is rotated toward the second fence panel and the latch member further comprising a recess that receives the center cross member of the second adjacent fence panel as the latch member returns to its first position thereby latching the second adjacent fence panel to the first fence panel so that the fence panels may be folded together and secured for transport, the latch member being releasable from the cross member of the second adjacent fence panel by manual rotation of the latch member to the second raised position.

4. The transportable corral of claim 3, wherein:
the fence panels each include first and second upright end members and at least top and bottom cross members and each fence panel comprises a first slot adjacent to the first upright end member and the bottom cross member and a second slot adjacent to the second upright end member and the bottom cross member, the slots being arranged such that when the fence panels are folded into a set, the slots align to provide a first channel at the rear of the set for receiving a rear lift bar that is suitable for being received and supported at the rear end of a trailer and a second channel at the forward end of the set for receiving a forward lift bar that is suitable for being received and supported at the forward end of a trailer.

* * * * *